US007336009B2

(12) United States Patent
Pettey

(10) Patent No.: US 7,336,009 B2
(45) Date of Patent: Feb. 26, 2008

(54) HOBBY SERVO ENHANCEMENTS

(75) Inventor: Brian Pettey, Winfield, KS (US)

(73) Assignee: BTR Robotics Limited Liability Company, Winfield, KS (US)

( * ) Notice: Subject to any disclaimer, the term of this patent is extended or adjusted under 35 U.S.C. 154(b) by 254 days.

(21) Appl. No.: 10/872,037

(22) Filed: Jun. 18, 2004

(65) Prior Publication Data

US 2004/0256937 A1    Dec. 23, 2004

Related U.S. Application Data

(60) Provisional application No. 60/479,697, filed on Jun. 19, 2003.

(51) Int. Cl.
H02K 5/00    (2006.01)
H02K 7/00    (2006.01)

(52) U.S. Cl. .................. 310/75 R; 310/91; 414/744.5

(58) Field of Classification Search .............. 310/91, 310/75 R, 78, 98–100; 440/7; 474/14; 477/4; 414/744.5; 248/631, 455
See application file for complete search history.

(56) References Cited

U.S. PATENT DOCUMENTS

| 3,586,272 | A | * | 6/1971 | Pestell ..................... 248/631 |
| 3,811,421 | A | * | 5/1974 | Betten ...................... 124/78 |
| 3,876,309 | A | * | 4/1975 | Zicaro et al. ............. 356/153 |
| 3,948,112 | A | * | 4/1976 | Gilbert ..................... 474/14 |
| 4,401,260 | A | * | 8/1983 | Grant ........................ 236/9 A |
| 4,657,478 | A | * | 4/1987 | LaZebnik et al. .......... 415/126 |
| 4,979,855 | A | * | 12/1990 | Babel ........................ 409/218 |
| 5,108,322 | A | * | 4/1992 | Henderson .................. 440/7 |
| 5,492,024 | A | * | 2/1996 | Siner ........................ 74/89.22 |
| 5,708,933 | A | * | 1/1998 | Nogami et al. ............ 399/167 |
| 5,725,352 | A | * | 3/1998 | Tanaka ..................... 414/744.5 |
| 6,499,649 | B2 | * | 12/2002 | Sayama et al. ............ 228/122.1 |

OTHER PUBLICATIONS

Anderson; D.; "Improving Servo Positioning Accuracy," http://www.seattlerobotics.org/encoder/200010/servohac.html pp. 1-9, Sep. 19, 2000.
Anderson; D.; "Improving Servo Positioning Accuracy," http://web.archive.org/web/*/http://www.geology.smu.edu/~dpa-www. pp. 1-8, Sep. 19, 2000.
Wheat, D.; "Hacking the Tower Hobbies TS-53 Servo," DPRG: http://web.archive.org/web/20040623092815/dprg.org/projects/2003-05a/, May 9, 2003, pp. 1-7.
Brown, J.; "Sub Micro Servo Motor Hack," DPRG http://web.archive.org/web/20040622205626/dprg.org/projects/1998-04b/ Apr. 1998, pp. 1-11.
Anderson, D. "Improving Servo Positioning Accuracy," DPRG, http://www.dprg.org/projects/2000-09a/?, Sep. 19, 2000. pp. 1-5.

* cited by examiner

*Primary Examiner*—Tran Nguyen
(74) *Attorney, Agent, or Firm*—Westman, Champlin & Kelly, P.A.

(57) ABSTRACT

An independent and modular apparatus is disclosed for extending the operational capacity of a servo motor. The apparatus includes a frame member having a servo motor and a rotatable shaft mounted therein. The output shaft of the servo motor and the rotatable shaft are displace from one another. Means are incorporated for translating rotation motion from the output shaft to the rotatable shaft so as to enable a torque or rotational capacity for the rotatable shaft that is greater than that of the servo output shaft.

20 Claims, 5 Drawing Sheets

HOBBY SERVO ENHANCEMENTS

The present application is based on and claims the benefit of U.S. provisional patent application Ser. No. 60/479,697, filed Jun. 19, 2003, the content of which is hereby incorporated by reference in its entirety.

BACKGROUND OF THE INVENTION

The present invention generally pertains to the hobby-mechanical industry. More specifically, the present invention pertains to means for extending the torque and/or rotational capacity of a hobby servo.

A servo motor (a.k.a. simply a "servo") is a device having a rotatable output shaft. The output shaft can typically be positioned to specific angular positions in accordance with a coded signal received by the servo. It is common that a particular angular position will be maintained as long as a corresponding coded signal exists on an input line. If the coded signal changes, the angular position of the shaft will change accordingly. Control circuits and a potentiometer are typically included within the servo motor casing and are functionally connected to the output shaft. Through the potentiometer (e.g., a variable resistor), the control circuitry is able to monitor the angle of the output shaft. If the shaft is at the correct angle, the motor actuates no further changes. If the shaft is not at the correct angle, the motor is actuated in an appropriate direction until the angle is correct.

There are different types of servo motors that include output shafts having varying rotational and torque capabilities. For example, the rotational and/or torque capability of an industrial servo is typically less restricted than that of a hobby servo. That being said, hobby servos are generally available commercially at a cost that is much less than that associated with industrial servos.

Because hobby servos are relatively small and inexpensive, they are popular within the hobby-mechanical industry for applications such as, but by no means limited to, hobby robotic applications and radio-controlled models (cars, planes, boats, etc.). One example of a hobby servo is the Futaba S-148 available from Futaba Corporation of America located in Schaumburg, Ill.

The output shaft of a hobby servo is typically capable of traveling somewhere around 180° (possibly up to 210° depending on manufacturer). The hobby servo shaft is generally not capable of turning any farther due to an internal mechanical stop. It is also typically true that the output shaft of a hobby servo is capable of producing a relatively limited amount of torque power. The torque and rotational limitations are adequate for many hobby applications, such as model car steering control, puppet control, robot arm or head movement and/or model airplane rudder control. It is true, however, that some applications require a servo having torque power and/or a rotational capacity that is beyond the capability of a typical hobby servo. Increased torque power and/or rotational capacity enable greater mechanical flexibility.

Some hobby servos can be mechanically altered to provide an extended range of rotation. However, this solution requires significant mechanical alteration that often only works for some types of servos. In most instances, hacking a hobby servo to enable an increased range of rotation requires more than a simple removal of a mechanical stop. Further, it is generally difficult to control rotation once a hobby servo has been adapted for extended rotation. It is also difficult to configure the control system to stop rotation within expanded rotational zones.

SUMMARY OF THE INVENTION

Embodiments of an independent and modular apparatus are disclosed for extending the operational capacity of a servo motor. Embodiments include a frame member having a servo motor and a rotatable shaft mounted therein. The output shaft of the servo motor and the rotatable shaft are displace from one another. Means are incorporated for translating rotation motion from the output shaft to the rotatable shaft so as to enable a torque or rotational capacity for the rotatable shaft that is greater than that of the servo output shaft.

DETAILED DESCRIPTION OF ILLUSTRATIVE EMBODIMENTS

Figure 1:
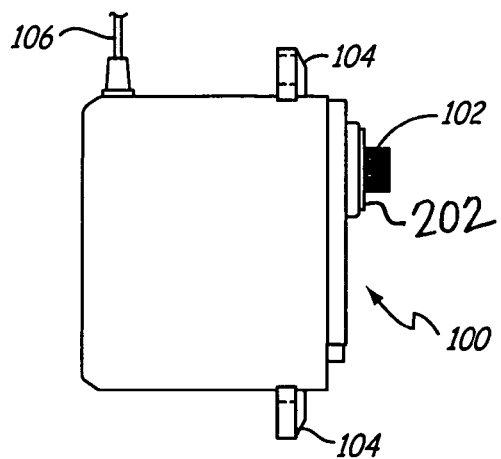
FIG. 1 is a side view of a hobby servo.

FIG. 1 is a side view of a hobby servo 100. Servo 100 includes attachment flanges 104. Flanges 104 typically include apertures formed therein for receiving an attachment mechanism (e.g., a screw, bolt, etc). The attachment mechanism is utilized to secure servo 100 within an operative environment. Servo 100 also includes an electrical connection 106 that enables the servo to receive electrical power and/or control signals.

Servo 100 includes a rotatable output shaft 102 also known as a servo spline 102. The servo spline can be positioned to specific angular positions in accordance with a coded signal received by the servo. It is common that a particular angular position will be maintained as long as a corresponding coded signal exists on an input line. If the coded signal changes, the angular position of the servo spline 102 will change accordingly. Control circuits and a potentiometer are typically included within the illustrated outer housing of servo motor 100. The control circuits and potentiometer are functionally connected to the servo spline 102. Through the potentiometer (e.g., a variable resistor), the control circuitry is able to monitor the angle of the output shaft. If the shaft is at the correct angle, the motor actuates no further changes. If the shaft is not at the correct angle, the motor is actuated in an appropriate direction until the angle is correct.

Rotation of servo spline 102 is typically limited to around 180°. In most cases, rotation is limited at least because of an internal mechanical stop. It is also true that servo spline 102 is capable of producing a relatively limited amount of torque power. The torque and rotational limitations are adequate for many hobby applications; however, some applications require a servo having torque power and/or a rotational capacity that is beyond the capability of a typical hobby servo. Increased torque power and/or rotational capacity enable greater mechanical flexibility.

Figure 2:
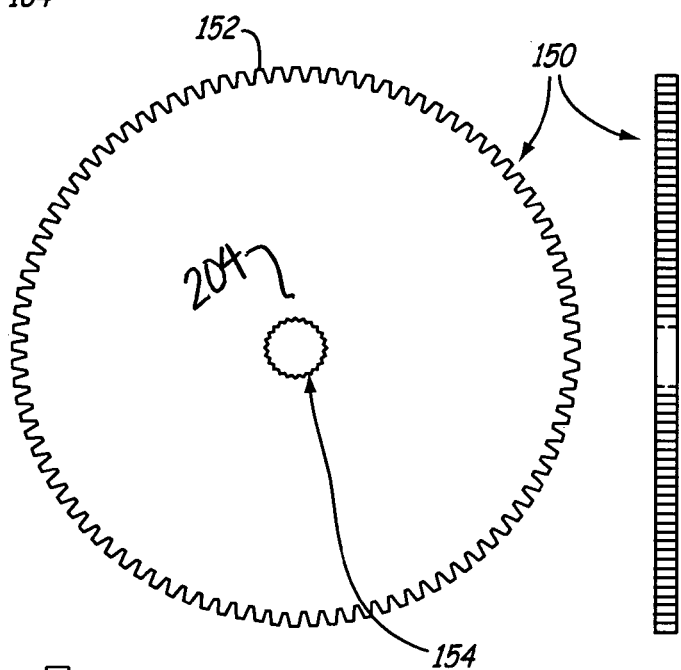
FIG. 2 is a side view of an enhancement gear.

FIG. 2, in accordance with one aspect of the present invention, is a side and front view of a servo enhancement gear 150. Gear 150 includes a plurality of gear teeth 152 disposed around an outer edge perimeter. A female spline receiver 154 is formed through the approximate middle of the gear 150. Spline receiver 154 is illustratively an aperture having a series of teeth formed around the outer perimeter. The teeth formed within spline receiver 154 are illustratively configured to engage a corresponding set of teeth formed on servo spline 102. It is common for servo spline 102 to have a 23, 24 or 25 tooth configuration. In accordance with one aspect of the present invention, a different gear 150 can be utilized depending upon which spline receiver 154 configuration is needed to accommodate a given spline 102. In accordance with another embodiment, a specialized spline receiver 154 configuration for a gear 150 is configured to accommodate attachment to multiple spline 102 configurations. It should be noted that spline receiver 154 configurations other than those suitable for 23, 24 or 25 tooth splines 102 are within the scope of the present invention.

Figure 3:
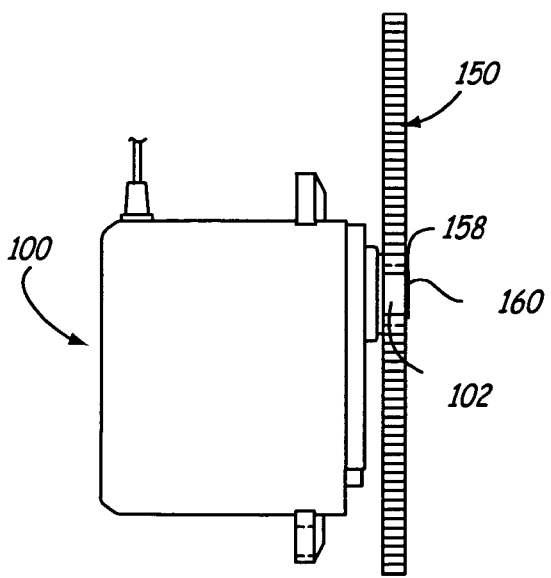
FIG. 3 is a side view of the enhancement gear after being engaged to the hobby servo.

FIG. 3, in accordance with one aspect of the present invention, is an illustration of an enhancement gear 150 that has been attached to a servo 100. Spline receiver 154 is engaged to spline 102. A washer 158 and a screw 160 are utilized to secure gear 150 to spline 102. In one embodiment, washer 158 has an overall diameter that is greater than spline receiver 154. Accordingly, the washer is centered on the outside face of gear 150 such that the aperture in the washer corresponds to an attachment aperture formed in spline 102. Screw 160 is then engaged into the aperture in spline 102 until washer 158 tightens against gear 150 thereby locking gear 150 into a rotational engagement with spline 102. Of course, other attachment schemes are within the scope of the present invention.

In accordance with one aspect of the present invention, gear 150 is configured such that the surface around spline receiver 154 will engage a surface proximate spline 152 in a flush manner. For example, with reference to FIG. 1, servo 100 includes a relatively planar surface 202. Similarly, with reference to FIG. 2, gear 150 includes a relatively planar surface 204. As is shown in FIG. 3, when gear 150 is engaged to servo 100, surfaces 202 and 204 are engaged to one another in a relatively flush relationship.

Figure 6:
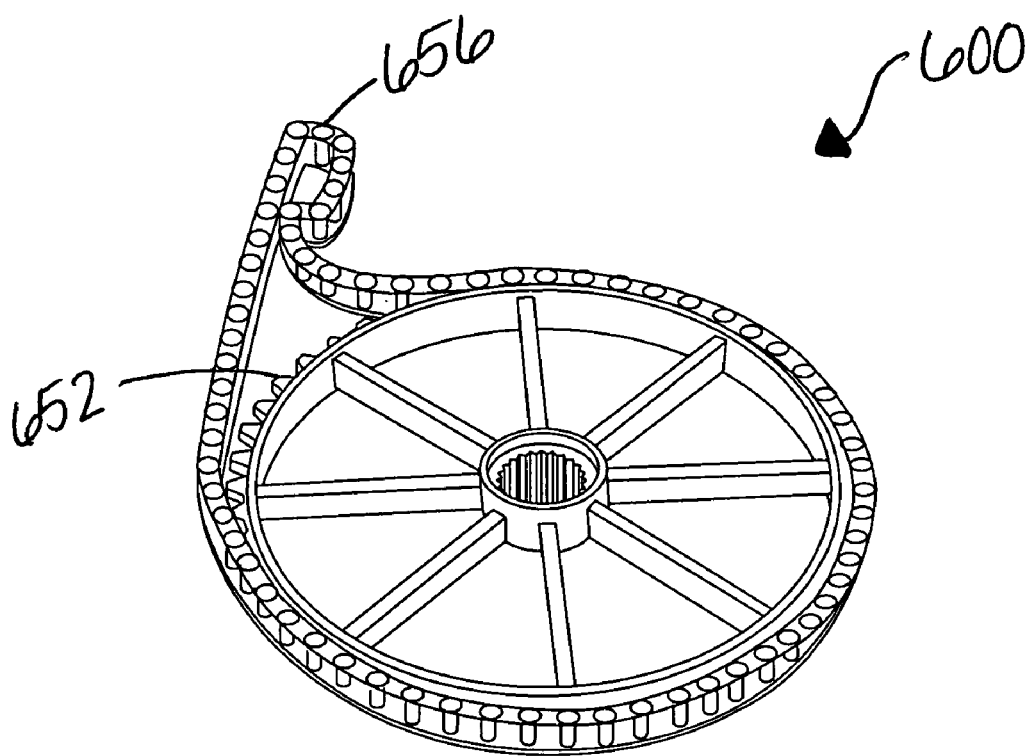
FIG. 6 is a top perspective view of an enhancement sprocket.

In accordance with one aspect of the present invention, a rotational mechanism other than a gear is attached to servo spline 102 in a manner substantially similar to the attachment scheme shown and described in relation to FIGS. 1-3. FIG. 6 is a perspective view of a sprocket 600. Sprocket 600 includes a plurality of teeth 652 disposed around an outer perimeter. A chain 656 is illustrated in engagement with a substantial number of teeth 652. A hub 658 is located within the center of sprocket 600 and is supported by a plurality of spokes 660. Hub 658 includes a spline receiver 654. Spline receiver 654 is illustratively similar to spline receiver 154 (FIG. 2) in that it is configured to engage a standard hobby servo output spline 102 (FIG. 1). Different versions of sprocket 600 can be created to accommodate servo splines 102. A sprocket 600 having a spline receiver 654 configured to receive a 23, 24, 25 tooth or any other output spline configuration is within the scope of the present invention.

Engagement of a sprocket 600 to a servo motor 100 is illustratively similar to the engagement scheme described in FIGS. 1-3. Spline receiver 654 is engaged to spline 102. In accordance with one embodiment, a washer/screw arrangement is utilized to secure the sprocket to the servo as was previously described. In accordance with another embodiment, however, the outside of hub 658 is configured such that the spline receiver 154 aperture is closed but for an opening large enough for insertion of an attachment mechanism (i.e., a screw). In this latter case, a washer is not necessary because a screw can be inserted through the aperture and into the engagement with the servo spline. As a screw is tightened into engagement with the servo spline, the head of the screw will engage the sprocket hub and secure the sprocket to the servo.

In accordance with one aspect of the present invention, hub 658 of sprocket 600 is configured such that a surface of the sprocket will flushly engage a surface of the servo motor when the motor and sprocket are functionally engaged to one another. As is shown in FIG. 6, an annular lip 680 is formed on the inside of hub 658 to enable a flush engagement with surface 202 illustrated in FIG. 1.

Accordingly, sprocket 600 is configured to attach to a hobby servo spline. Sprocket 600 includes a protruding wall having an interior surface 682. A toothed spline is circumferentially formed around at least a portion of the interior surface. In accordance with one embodiment, a bottom surface (not shown) is formed at the base of one end of the protruding wall 681 and has an aperture formed therein. In order to accommodate attachment of sprocket 600 to an output shaft of a servo, the toothed spline formed on the interior surface of the protruding wall is configured to engage the toothed spline on an exterior surface of the servo output shaft. The bottom surface is configured to prevent the servo output shaft from sliding all the way through the opening within hub 658. A screw can be inserted through the aperture formed in the bottom surface and securedly engaged to a screw-receiving aperture formed in the servo output shaft.

In accordance with one aspect of the present invention, any rotational device can be attached to a servo output shaft in a manner as described herein in the context of a gear and a sprocket. Once attached to the servo output shaft, the item will generally rotate when the output shaft rotates. Accordingly, the rotation of the item will be limited just as is the rotation of the output shaft.

As was mentioned above, some mechanical applications require a servo having a range of rotational greater than the range typically associated with a hobby servo. Also, some mechanical applications require a servo having greater torque power than that typically associated with a hobby servo. The present invention pertains to simple and inexpensive enhancements for hobby servos that are capable of enabling a greater range of rotation or a greater range of torque power than typically associated with a hobby servo.

Accordingly, a gear, sprocket or any other rotational mechanism can be secured to the output shaft of a hobby servo. In accordance with one aspect of the present invention, the hobby servo can then be mounted in a frame and configured to translate rotational motion to a shaft that is rotatably mounted within the same frame. The shaft will then be configured for a torque and/or rotational capacity that is greater than the output shaft of the servo itself.

Figure 4:
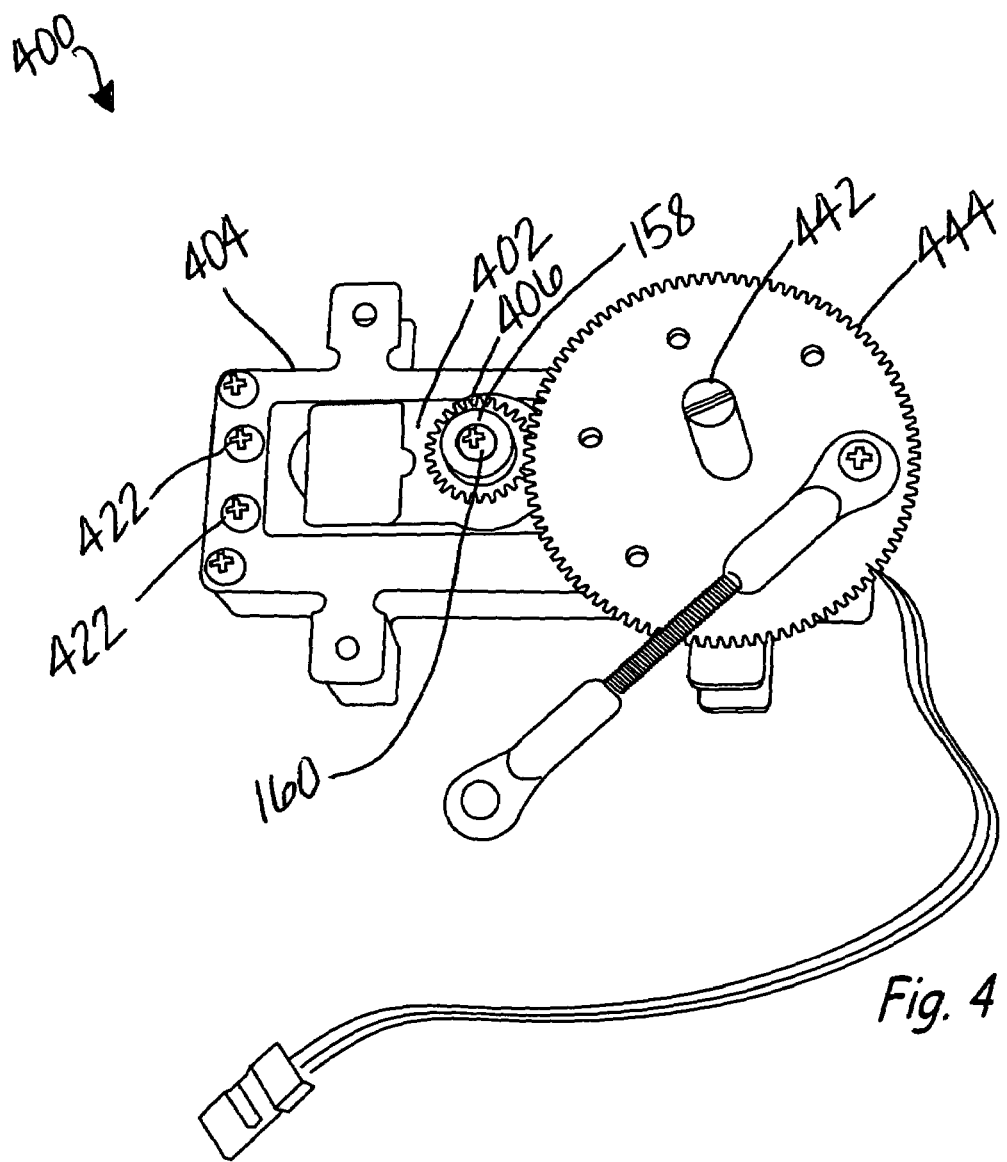
FIG. 4 is a top perspective view of an apparatus for extending the torque capacity of a hobby servo motor.

FIG. 4 is a perspective view of an apparatus 400 for extending the operational capacity of a servo motor 402. Servo motor 402 is fixedly secured within a frame 404. A gear 406 is attached to the output spline 402 with a screw 160 and a washer 158 as described in relation to FIGS. 1-3 (another attachment scheme such as the non-washer scheme described in relation to sprocket 600 in FIG. 6 could alternatively be utilized). Gear 406 is illustratively similar to gear 150 (FIG. 2) only smaller. Servo 402 is illustratively similar to servo 100. The servo spline illustratively has a limited capacity for rotation (e.g., around 180°).

Servo 402 is secured within frame 404. For example, frame 404 illustratively includes apertures formed therein and configured to receive an attachment mechanism (e.g., a screw, bolt, etc). In one embodiment, apertures formed in frame 404 are configured to line up with apertures formed in attachment flanges 104 (FIG. 1). An attachment mechanism can then be inserted through the apertures and flanges 104 and corresponding apertures in frame 404. In this way, the servo can be secured to the frame. Within FIG. 4, screws 422 are illustrated. These screws illustratively are inserted through apertures in a flange 104, and through apertures formed in the frame. A bolt can then be engaged to the ends of the screws 422 so as to secure flange 104 to the frame 404. An auxiliary shaft 442 is rotatably mounted in frame 404 and is displaced from servo 402. An enhancement gear 444 is engaged to gear 406. Again, gear 406 is attached to the output shaft of servo 402. Accordingly, when the output shaft of servo 402 is caused to rotate, gear 406 causes that rotation to be translated to enhancement gear 444 and therefore to auxiliary shaft 442. Because gear 406 is considerably smaller than enhancement gear 444, the torque associated with auxiliary shaft 442 will be much greater than the torque of the servo motor output shaft, and much greater than the overall rotation of gear 406. The expanded torque associated with shaft 442 can then be configured to actuate a mechanical load. For example, an item can be attached to auxiliary shaft 442 and utilized to mechanically take advantage of the expanded torque.

In accordance with one embodiment, enhancement gear 444 has a diameter that is much less than the diameter of gear 406. Accordingly, when gear 406 is attached to a hobby servo output shaft, and when gear 444 is attached to an auxiliary shaft, then auxiliary shaft 442 will produce a range of rotation that is greater than that generated by the output shaft of the hobby servo.

Figure 5:
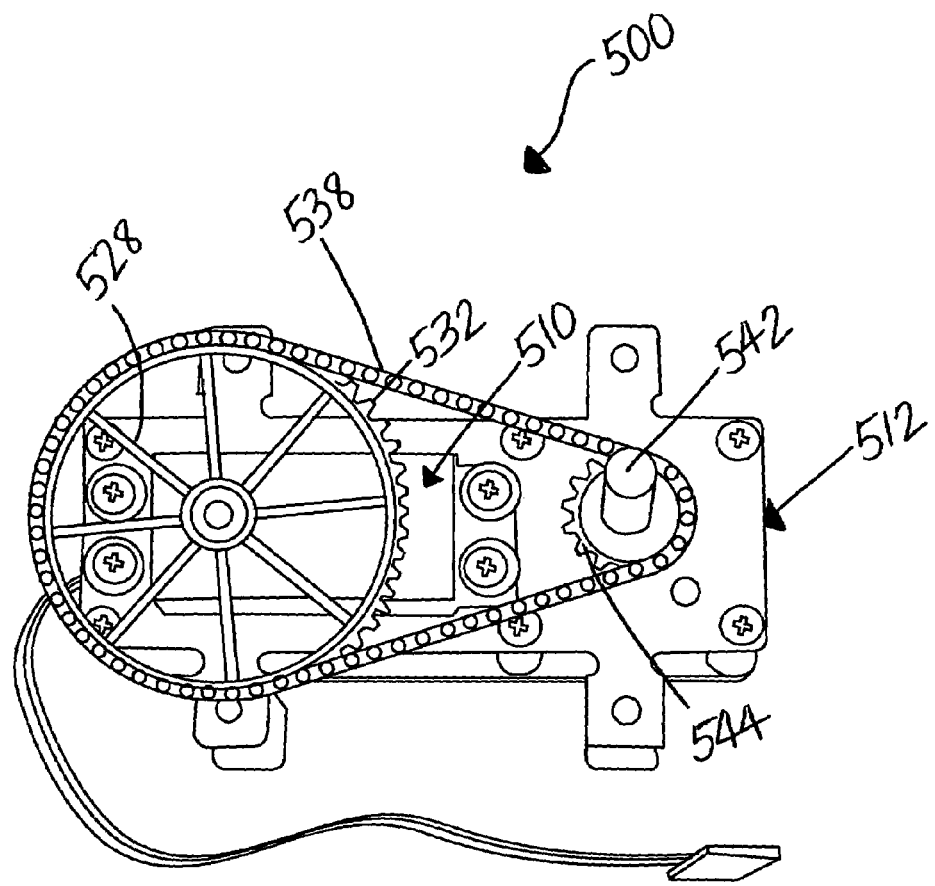
FIG. 5 is a top perspective view of an apparatus for extending the rotational capacity of a hobby servo motor.

FIG. 5 is a top perspective view of an apparatus 500 for extending the operational capacity of a servo motor. FIG. 5 shows a hobby servo 510 mounted within a metal frame 512. An auxiliary shaft 542 is rotatably mounted within frame 512 and is displaced from hobby servo 510. A chain 538 is engaged to teeth 532 of an enhancement sprocket 528. An auxiliary gear 544 is attached to auxiliary shaft 542. Illustratively, enhancement sprocket 528 can be attached to the output shaft of hobby servo 510 as was described in relation to FIG. 6. Chain 528 illustratively stays engaged to teeth 532 while chain 538 becomes engaged to auxiliary gear 544. Accordingly, when the output shaft of hobby servo 510 is caused to rotate, chain 538 causes that rotation to be translated to auxiliary gear 544 and therefore to auxiliary shaft 542. Because enhancement sprocket 528 is considerably larger than auxiliary sprocket 544, the rotation of auxiliary shaft 542 will be much greater than the rotation of the output shaft of hobby servo 510 and much greater than the overall rotation of enhancement sprocket 528. The expanded rotation of auxiliary shaft 542 can then be configured to actuate a mechanical load. For example, a mechanical item can be attached to auxiliary shaft 542 and utilized to mechanically take advantage of the expanded rotational motion.

In accordance with one embodiment, enhancement sprocket 528 has a diameter that is much less than the diameter of the corresponding auxiliary gear 544. Accordingly, when enhancement sprocket 538 is attached to a hobby servo output shaft, and when auxiliary gear 544 is attached to an auxiliary shaft, and when chain 538 is in place, then auxiliary shaft 542 will produce a torque power that is greater than that generated by the output shaft of the hobby servo.

In accordance with one aspect of the present invention, a belt design can be utilized rather than a chain design. For example, enhancement sprocket 528 and auxiliary gear 544 can be configured to accommodate a belt rather than a chain. Accordingly, as the output shaft rotates and causes enhancement sprocket 528 to rotate, a belt moves around the outside diameter of the enhancement sprocket as well as around the outside diameter of the auxiliary gear, such that rotational motion is translated from the output shaft to the auxiliary shaft. When a belt is utilized, enhancement sprocket 528 and auxiliary gear 544 need not necessarily have gear teeth.

As was described in relation to FIG. 4, in accordance with another aspect of the present invention, neither a belt nor a chain is utilized. Instead, enhancement sprocket 528 and auxiliary gear 544 are directly geared toward one another. The enhancement sprocket 528 is secured to the output shaft of the hobby servo 510 as discussed in relation to FIGS. 1-3. The enhancement sprocket 528 is directly and operably engaged to auxiliary gear 544. Auxiliary gear 544 is configured to translate rotational motion to auxiliary shaft 542.

Figure 7:
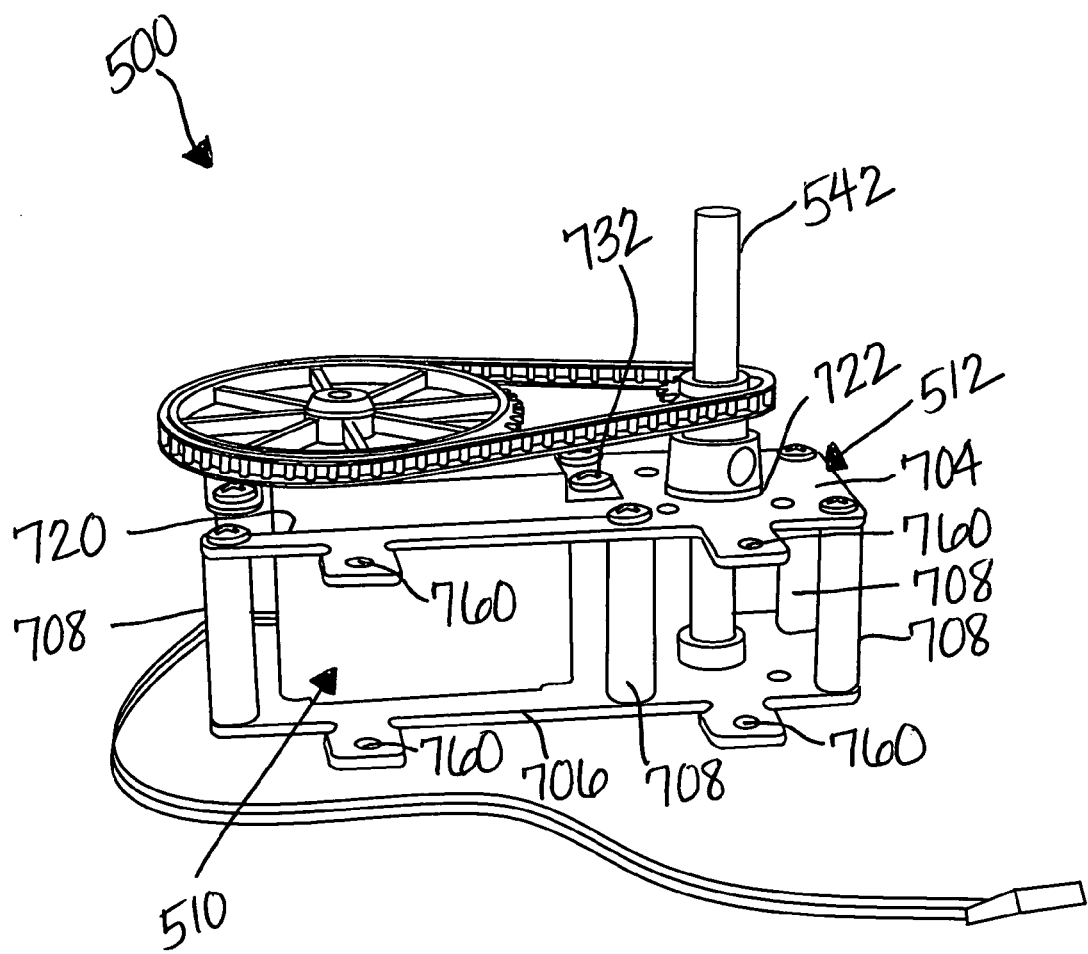
FIG. 7 is a side perspective view of an apparatus for extending the rotational capacity of a hobby servo motor.

FIG. 7 is a side perspective view of the apparatus 500 previously illustrated and described in relation to FIG. 5. The view shown in FIG. 7 demonstrates how frame 512 is constructed. Frame 512 includes apertures 760 for receiving an attachment mechanism (e.g., a screw, bolt, etc) for attaching aperous apparatus 500 within an operational environment. For example, the frame will be secured in a location proximate to a target for mechanical actuation. The frame member includes a first aperture 720 for receiving and supporting servo 510. A second aperture is also formed in the frame and is configured to receive and support shaft 542. Aperture 720 is displaced from aperture 722.

Attachment apertures are formed in the frame as necessary to accommodate attachment of servo 510 to the frame (e.g., attachment flanges associated with the servo have apertures that are lined up with the attachment flanges within the frame and then an attachment mechanism is slid through the aligned apertures to secure the servo to the frame).

Frame 512 includes a first panel portion 704 that is displaced from but connected to a second panel portion 706. A displacement mechanism 708 is positioned between panels portions 704 and 706. In fact, several displacement portions 708 are utilized to space and support the panel portions relative to one another. Each displacement mechanism 708 is illustratively attached to the first and second panel portions. For example, an attachment mechanism (e.g., a screw, an adhesive, etc) is utilized to secure the displacement mechanisms 708 between the panel portions. In one embodiment, a screw is inserted through an aperture in a panel portion and into the displacement portion 708. The screw can extend all the way through the displacement portion 708 and through a corresponding aperture formed in the opposite panel portion wherein a bolt is utilized to secure panel portions to the displacement mechanism. Alternatively, a single screw can be inserted through each end of the displacement mechanism through an aperture formed in the panel portion such that the screw engages and secures itself to the inside of the displacement portion thereby securing the panel portion to the displacement portion.

Although the present invention has been described with reference to preferred embodiments, workers skilled in the art will recognize that changes may be made in form and detail without departing from the spirit and scope of the invention.

What is claimed is:

1. An apparatus for providing enhanced hobby servo motor torque capacity, the apparatus comprising:
a hobby servo motor comprising a first side and a second side wherein the output shaft of the hobby servo motor has a limited range of rotational motion;
a first platform displaced from but connected to a second platform wherein the first platform is positioned proximate to the first side of the hobby servo motor and the second platform is positioned proximate to the second side of the hobby servo motor;
a first aperture defined within the first platform and configured to support the hobby servo motor;
a second aperture defined within the first platform and configured to receive a rotatable shaft;
a rotatable shaft mounted within the second aperture;
a first gear attached to the output shaft of the hobby servo motor wherein the first gear is configured to engage a second gear attached to the rotatable shaft; and
a second gear attached to the rotatable shaft wherein the diameter of the second gear is greater than the diameter of the first gear.

2. An apparatus for providing enhanced hobby servo motor rotational capacity, the apparatus comprising:
a hobby servo motor comprising a first side and a second side wherein the output shaft of the hobby servo motor has a limited range of rotational motion;
a first platform displaced from but connected to a second platform wherein the first platform is positioned proximate to the first side of the hobby servo motor and the second platform is positioned proximate to the second side of the hobby servo motor;
a first aperture defined within the first platform and configured to support the hobby servo motor;
a second aperture defined within the first platform and configured to receive a rotatable shaft;
a rotatable shaft mounted within the second aperture;
a first sprocket attached to the output shaft of the hobby servo motor;
a second sprocket attached to the rotatable shaft wherein the diameter of the second sprocket is smaller than the diameter of the first sprocket; and
a chain connecting the first sprocket to the second sprocket.

3. An apparatus for providing enhanced hobby servo motor operational capacity, the apparatus comprising:
a hobby servo motor comprising a first side and a second side;
a first platform displaced from but connected to a second platform;
a first aperture defined within the first platform and configured to support the hobby servo motor;
a second aperture defined within the first platform and configured to receive a rotatable shaft; and
wherein the first platform is positioned proximate to the first side of the hobby servo motor and the second platform is positioned proximate to the second side of the hobby servo motor.

4. The apparatus of claim 3, further comprising an attachment aperture defined within the second platform and configured to receive an attachment mechanism in order to secure the apparatus within an operational environment.

5. The apparatus of claim 3, further comprising a displacement mechanism positioned between the first and second platforms.

6. The apparatus of claim 5, wherein the displacement mechanism is attached to the first and second platforms.

7. The apparatus of claim 3, further comprising a shaft rotatably mounted within the second aperture.

8. The apparatus of claim 7, further comprising means for transferring rotational motion from an output shaft associated with the servo motor to said shaft rotatably mounted within the second aperture.

9. The apparatus of claim 8, wherein said means for transferring rotational motion comprises a first gear attached to the output shaft, the first gear being configured to engage a second gear attached to the shaft rotatably mounted within the second aperture.

10. The apparatus of claim 9, wherein the first gear is attached to the output shaft through an engagement with a spline mechanism.

11. The apparatus of claim 9, wherein said first gear has a greater diameter than the diameter of said second gear.

12. The apparatus of claim 9, wherein said first gear has a smaller diameter than the diameter of said second gear.

13. The apparatus of claim 9, wherein the first gear included a female spline receiver for accommodating attachment to a spline associated with the output shaft.

14. The apparatus of claim 13, wherein the spline includes a certain number of teeth, wherein the certain number of teeth is selected from a group consisting of 23, 24, and 25.

15. The apparatus of claim 9 wherein the shaft rotatably mounted within the second aperture is configured to actuate a mechanical load.

16. The apparatus of claim 8, wherein said means for transferring rotational motion comprises:
a first sprocket attached to the output shaft;
a second sprocket attached to the shaft mounted within the second aperture; and
a chain connecting the first sprocket to the second sprocket.

17. The apparatus of claim 16, wherein the first sprocket has a greater diameter than the diameter of the second sprocket.

18. The apparatus of claim 16, wherein the first sprocket has a smaller diameter than the diameter of the sprocket.

19. The apparatus of claim 16, wherein the first gear includes a female spline receiver for accommodating attachment to a spline associated with the output shaft.

20. The apparatus of claim 3 wherein the output shaft of the hobby servo motor has a rotational angular capacity of less than a full rotation.

* * * * *